May 28, 1940.　　　L. F. CARTER　　　2,202,142
INSTRUMENT DIAL ILLUMINATION
Filed March 27, 1937
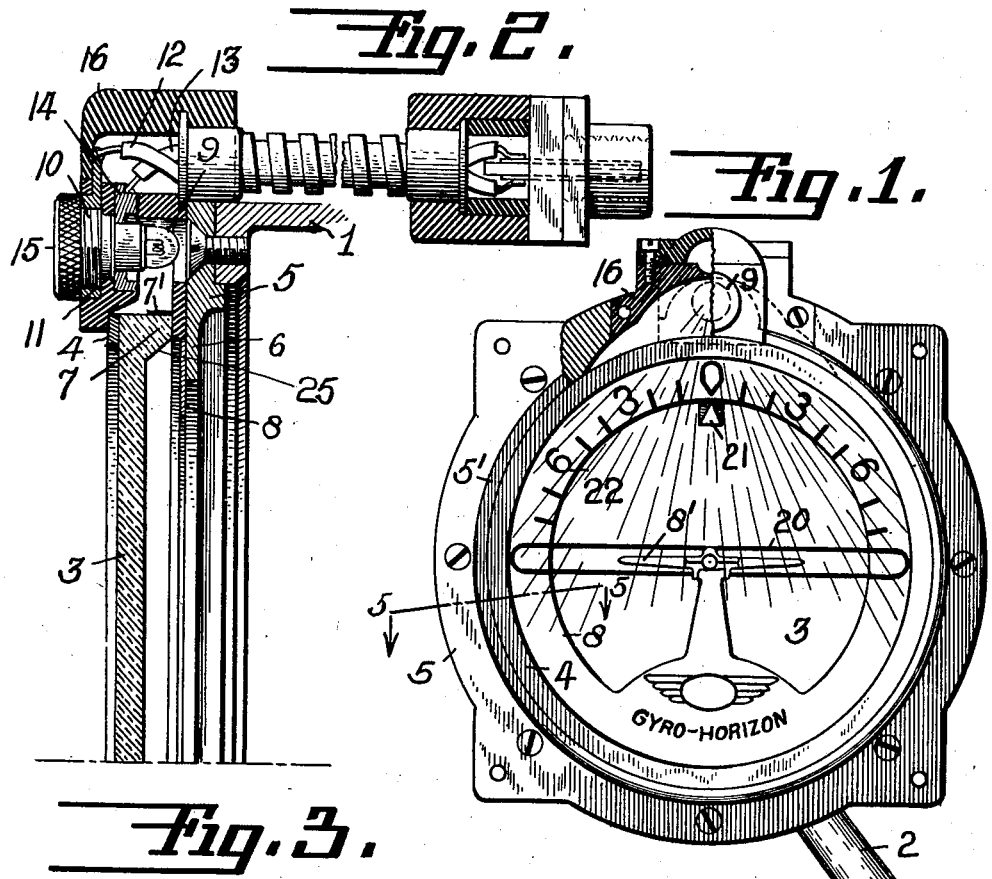
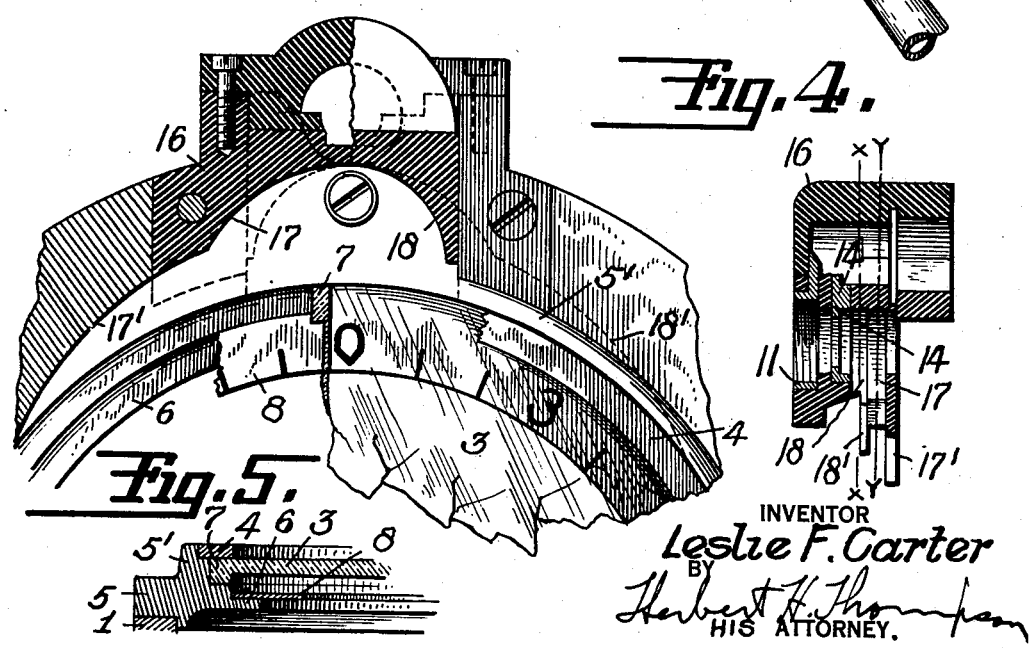
INVENTOR
Leslie F. Carter
BY
Herbert H. Thompson
HIS ATTORNEY.

UNITED STATES PATENT OFFICE 2,202,142

INSTRUMENT DIAL ILLUMINATION

Leslie F. Carter, Leonia, N. J., assignor to Sperry Gyroscope Company, Inc., Brooklyn, N. Y., a corporation of New York Application March 27, 1937, Serial No. 133,313

4 Claims. (Cl. 240—2.1)

This invention relates to illuminating means for indicators such as employed on the dashboards of automobiles or the instrument panels of aircraft. In both cases a system of indirect illumination is desirable, wherein a minimum amount of light is reflected into the eyes of the observer, but the indications are rendered distinctly visible from the driver's or pilot's seat.

My invention is shown as applied to a form of aircraft instrument known as an artificial or gyro horizon, but it is obvious that it may be applied to other types of instruments. It is especially designed, however, for instruments operated by air, in which the casing is sealed, so that removal of the lamp will not disturb the vacuum within the casing.

Referring to the drawing, showing one form my invention may assume:

Fig. 1 is a front elevation, partly in section, of an artificial horizon with my invention applied thereto.

Fig. 2 is a vertical section, on an enlarged scale, through the front upper portion of the casing.

Fig. 3 is an enlarged portion of Fig. 1, partly in section, the left hand part being taken on section line X—X in Fig. 4 and the right hand part on section line Y—Y in Fig. 4.

Fig. 4 is a sectional view of the upper portion of Fig. 2, with the lamp and wires removed.

Fig. 5 is a section on line 5—5 of Fig. 1.

As stated above, most of the aircraft instruments are air driven, the casing 1 being sealed and having air continuously withdrawn therefrom through pipe connection 2. The front plate 5 of the casing is shown as having a front window 3 which is held in place by a snap ring 4 which tightly fits in annular rib 5' projecting from plate 5. Preferably said window is spaced from the inner flange 6 of plate 5. This may be accomplished by making the window with an inwardly extending circumferential annulus or rim 7 which spaces the window from said flange, as shown in Fig. 2. Graduations 22 may be provided on the thin ring 8 behind said window, to which is attached a fixed indicator 8' in the form of an airplane. The movable indicators shown as horizon bar 20 and index 21 lie behind ring 8, but close enough thereto to be illuminated from the same lamp that illuminates the graduations 22.

The lamp 9 is placed opposite the transparent rim 7, i. e., with its filament below the under surface of window 3, so that the major portion of the light will shine through said rim instead of transversely through the entire thickness of the front window, as was proposed in my prior application for Illuminator for indicator dials, Serial No. 76,984, filed April 29, 1936, now Patent No. 2,131,471 of September 27, 1938. This has the advantage over the prior application of not showing up imperfections in or finger marks on the glass face, and of transmitting a greater portion of the light by not having to transmit through so much of the longitudinal section of glass or whatever transparent material is used for the window. It also utilizes the under surface of the window as a reflecting surface as well as the upper surface, so that more light is reflected onto the movable indicators 20 and 21. If desired, the portion of the rim immediately under the light may be painted or ground to reduce the light entering at that point, as indicated at 7'.

The lamp is shown as provided with a screw base 10 so that it may be screwed into the threaded thimble or socket 11 which is connected to one of the wires 12. The other wire 13 is connected to a small ring 14 insulated from thimble 11 and contacting with the shank 15 of the lamp holder in the well known manner. The main casing 1 is provided with a cut-out portion at its top, into which is fastened the lamp holding and reflecting member 16, which carries the lamp holder and is preferably of insulating material. This member has an upper inner reflecting surface curved in two planes, as shown at 17 at the left hand side of Fig. 3, and at 18 at the right hand side of Fig. 3, these two sides being taken in different planes, as shown on section lines Y—Y and X—X in Fig. 4. These surfaces have laterally extending curved surfaces 17' and 18' having, preferably, a different radius of curvature than the surfaces 17 and 18. The surfaces 17 and 18 and their extensions 17' and 18' cover a substantial arc of the rim 7 so as to direct light rays through the rim through a substantial arc and not all at one point. All of said surfaces are painted with reflecting paint so that the light is directed downwardly through rim 7 and underneath the front glass 3, so that the under surface of the glass reflects the light onto the instrument dial. The outer edge of the glass 3, except where the light enters, may also be painted with reflecting paint.

It should be observed that although the lamp is incorporated in the casing, it may readily be removed without disturbing the vacuum in the casing since it is outside of the casing and the front plate 5 and window 3, although the light therefrom shines behind the front window and between it and the dials to be illuminated.

It is also obvious that this system may be used to illuminate more than one instrument dial, if desired, as indicated in my aforesaid application.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

In Fig. 5, for instance, the inner periphery of the flange or rim 7 of the glass window is shown as perpendicular to the face, but in Fig. 2 this inner surface is shown as beveled outwardly, as at 25. This has the advantage of refracting the light rays from the lamp inwardly toward the graduations 22 and index 21, giving efficient illumination especially around the periphery of the dial.

Having described my invention, what I claim and desire to secure by Letters Patent is:

1. In an indicating instrument having a front plate with an opening therein through which the indicator behind said plate is visible, a flat window in said opening spaced from the front plate by a circular rim extension or ring, a small lamp positioned adjacent the space between said window and plate to shine its rays through said ring and between the back of the window and the indicator to thereby illuminate the latter by reflected light, a reflecting surface behind said lamp covering a substantial arc of said rim, and a substantially opaque mask covering the part of said ring nearest the lamp, whereby substantially uniform illumination of the dial is secured.

2. An illuminating device for instrument panels of vehicles, comprising a casing having a transparent window consisting of a flat pane and a circular flat rim extension thereunder, indications behind said window within said casing, a lamp holder of insulating material to one side of said window and secured to the exterior of said casing, an electric light bulb in said holder with its filament behind the inner face of said window opposite said extension, but in front of said indications, and a purality of reflectors of different curvatures behind said lamp to direct light through a substantial arc of said rim.

3. In an illuminating device for instruments of vehicles, a casing, a dial in said casing, a transparent window in said casing consisting of a pane having substantially plane and parallel surfaces and an annular transparent extension toward said dial, a lamp and lamp holder therefor adjacent said casing and the rim of said extension, a plurality of reflectors of different curvatures behind said lamp, and an opaque mask covering part of said rim nearest said lamp, whereby excessive illumination of any part of said dial is prevented.

4. An illuminating device as claimed in claim 3, in which said reflectors are formed as part of said lamp holder.

LESLIE F. CARTER.